United States Patent
Yang et al.

(10) Patent No.: US 9,650,033 B2
(45) Date of Patent: May 16, 2017

(54) VEHICLE, A HYBRID POWER SYSTEM THEREOF AND A CONTROL METHOD THEREFOR

(71) Applicants: BEIQI FOTON MOTOR CO., LTD., Beijing (CN); BEIJING ZHI KE INVESTMENT AND MANAGEMENT CO., LTD., Beijing (CN)

(72) Inventors: Weibin Yang, Beijing (CN); Junhong Zhang, Beijing (CN); Haibo Liang, Beijing (CN); Lianjun Lu, Beijing (CN); Wei Yan, Beijing (CN); Shan Lu, Beijing (CN); Xiao Ma, Beijing (CN); Guofei Li, Beijing (CN); Ruchuan Liang, Beijing (CN); Liye Liu, Beijing (CN); Yang Li, Beijing (CN)

( * ) Notice: Subject to any disclaimer, the term of this patent is extended or adjusted under 35 U.S.C. 154(b) by 0 days.

(21) Appl. No.: 14/891,323

(22) PCT Filed: May 14, 2014

(86) PCT No.: PCT/CN2014/077408
§ 371 (c)(1),
(2) Date: Nov. 13, 2015

(87) PCT Pub. No.: WO2014/183635
PCT Pub. Date: Nov. 20, 2014

(65) Prior Publication Data
US 2016/0114787 A1    Apr. 28, 2016

(30) Foreign Application Priority Data
May 14, 2013 (CN) .......................... 2013 1 0178097

(51) Int. Cl.
*B60K 6/38* (2007.10)
*B60W 20/13* (2016.01)
(Continued)

(52) U.S. Cl.
CPC ............... *B60W 20/13* (2016.01); *B60K 6/38* (2013.01); *B60K 6/442* (2013.01); *B60K 6/52* (2013.01);
(Continued)

(58) Field of Classification Search
None
See application file for complete search history.

(56) References Cited

U.S. PATENT DOCUMENTS
2002/0033059 A1    3/2002    Pels et al.

FOREIGN PATENT DOCUMENTS
CN    1637327 A    7/2005
CN    1857941 A    11/2006
(Continued)

OTHER PUBLICATIONS

ISR for related PCT/CN2014/077408 mailed on Jul. 22, 2014 and its English translation by WIPO.
(Continued)

*Primary Examiner* — Thomas Tarcza
*Assistant Examiner* — Garrett Evans
(74) *Attorney, Agent, or Firm* — Ladas & Parry, LLP

(57) ABSTRACT

Disclosed are a hybrid power system of a vehicle and a control method therefor. The hybrid power system of a vehicle comprises: an engine; a dual-clutch automatic transmission comprising an ISG motor; a first power unit and a second power unit; a power battery, the power battery being connected to the ISG motor by the first power unit; a power battery manager, the power battery manager being connected to the power battery and used to test an SOC of the
(Continued)

power battery; a rear wheel drive motor, the rear wheel drive motor being connected to the power battery by the second power unit, and the rear wheel drive motor being connected to a rear speed reducer of the vehicle; and a vehicle controller, the vehicle controller being connected to the power battery manager, and the vehicle controller controlling the vehicle to enter a corresponding operating mode according to the SOC and drive required torque WTD at a wheel of the vehicle. The hybrid power system of a vehicle and the control method therefor can ensure that a vehicle operates in the best operating mode, thereby improving the performance of the vehicle.

24 Claims, 4 Drawing Sheets

(51) Int. Cl.
| | | |
|---|---|---|
| B60K 6/52 | (2007.10) |
| B60W 10/113 | (2012.01) |
| B60W 20/10 | (2016.01) |
| B60W 20/00 | (2016.01) |
| B60K 6/442 | (2007.10) |
| B60K 17/356 | (2006.01) |
| B60W 10/06 | (2006.01) |
| B60W 10/08 | (2006.01) |
| B60W 10/11 | (2012.01) |
| B60W 10/119 | (2012.01) |

(52) U.S. Cl.
CPC .......... *B60K 17/356* (2013.01); *B60W 10/06* (2013.01); *B60W 10/08* (2013.01); *B60W 10/11* (2013.01); *B60W 10/113* (2013.01); *B60W 10/119* (2013.01); *B60W 20/00* (2013.01); *B60W 20/10* (2013.01); *B60W 2510/244* (2013.01); *B60W 2520/10* (2013.01); *B60W 2520/30* (2013.01); *B60W 2540/10* (2013.01); *B60W 2710/06* (2013.01); *B60W 2710/083* (2013.01); *B60W 2710/10* (2013.01); *B60Y 2200/10* (2013.01); *B60Y 2300/188* (2013.01); *B60Y 2300/45* (2013.01); *B60Y 2300/78* (2013.01); *B60Y 2300/91* (2013.01); *B60Y 2400/428* (2013.01); *Y02T 10/6265* (2013.01); *Y10S 903/912* (2013.01); *Y10S 903/93* (2013.01)

(56) References Cited

FOREIGN PATENT DOCUMENTS

| | | |
|---|---|---|
| CN | 102897016 A | 1/2013 |
| DE | 10153014 A1 | 5/2003 |

OTHER PUBLICATIONS

Written Opinion for related PCT/CN2014/077408 (English translation not available on WIPO).
Written Opinion for related PCT/CN2014/077408 mailed on Jul. 23, 2014 and its English translation by WIPO.

VEHICLE, A HYBRID POWER SYSTEM THEREOF AND A CONTROL METHOD THEREFOR

CROSS-REFERENCE TO RELATED APPLICATIONS

This application is the U.S. National Stage of International Patent Application No. PCT/CN2014/077408 filed on May 14, 2014, which claims the benefit of and priority to Chinese Patent Application 201310178097.0 filed on May 14, 2013, the disclosures of which are hereby incorporated in their entireties by reference.

TECHNICAL FIELD

The present invention relates to a technical field of vehicles, specifically to a hybrid power system of a vehicle, a vehicle including the same and a control method therefor.

BACKGROUND OF THE INVENTION

At present, for four wheel drive (4WD) hybrid power systems, there is a driving system and a control method used for a 4WD hybrid vehicle, and a control method for a 4WD electric hybrid vehicle. The two control methods are mainly used for a vehicle structure as shown in FIG. 1. The vehicle mainly includes: an engine 1, ISG (integrated starter and generator) motor 2, AMT (automated mechanical transmission) 3, a main motor 5, a main reducer 4 and a differential 6. The AMT 3 and the ISG motor 2 are arranged, separately. The control methods mainly control the vehicle to enter a corresponding working mode based on an accelerating pedal opening degree of the vehicle.

In the prior art, t is only based on the accelerating pedal opening degree to control the vehicle to enter a corresponding working mode, neither various parts of the vehicle, are in best condition, nor the vehicle.

SUMMARY OF THE INVENTION

The present invention aims to solve at least one of the above technical problems.

Therefore, one purpose of the present invention is to provide a hybrid power system for a vehicle, and the system can control the vehicle to enter a best working mode, so that the parts of the vehicle can work in a best mode, and improves the performance of the vehicle.

Another purpose of the present invention is to provide a vehicle.

A further purpose of the present invention is to provide a control method for the vehicle, the method can control the vehicle to enter a best working mode, so that the parts of the vehicle can work in a best mode, and improves the performance of the vehicle.

Therefore, the present invention provides a hybrid power system for a vehicle, comprising:

an engine;

a dual-clutch automatic transmission, comprising an ISG motor, a first input shaft, a second input shaft, a general input shaft and a first output shaft, a second output shaft, a general output shaft, the dual-clutch automatic transmission is connected with the engine via one end of the general input shaft, the other end of the general input shaft is connected with the first input shaft and the second input shaft, via a first clutch and a second clutch respectively, the ISG motor is connected with one of the first input shaft and the second input shaft, one end of the general output shaft is connected with the first output shaft and the second output shaft respectively, the other end of the general output shaft is connected with a front reducer of the vehicle;

a first power unit and a second power unit;

a power battery, connected to the ISG motor via the first power unit;

a BMS, connected with the power battery, for detecting a SOC of the power battery a rear wheel drive motor, connected with the power battery via the second power unit, and connected with the rear reducer of the vehicle; and a vehicle controller, connected with the BMS, and used for controlling the vehicle to enter a corresponding working mode, according to the SOC and a wheel torque demand WTD.

In the hybrid power system, the vehicle controller is used for controlling the vehicle to enter a best working mode, according to the SOC and WTD. Therefore, the parts of the vehicle can work in a best mode, and this improves the performance of the vehicle. In addition, the ISG motor is integrated in the dual-clutch automatic transmission, it is possible to save space in the vehicle.

Preferably, the vehicle controller may determine the WTD according a vehicle speed and an accelerating pedal opening degree.

Preferably, the working mode comprises: a parking mode, a rear axle electrically-driven mode, a four-wheels driving mode, an engine start-stop mode, a serially-driving mode and a front axle driving mode.

Preferably, the vehicle controller controls the shift among the parking mode, the rear axle electrically-driven mode, the four-wheels driving mode, the engine start-stop mode, the serially-driving mode and the front axle driving mode, according to the SOC and the WTD.

Preferably, the first output shaft is provided with at least one synchronizer, and the second output shaft is provided with at least one synchronizer.

Preferably, the rear reducer is a single-speed reducer.

The present invention further provides a vehicle comprising the hybrid power system as above mentioned.

The present invention further provides a control method for a vehicle including the hybrid power system as above mentioned, wherein the method comprises the following steps:

detecting the SOC of the power battery, after the vehicle is powered up;

detecting an accelerating pedal, so as to obtain a accelerating pedal opening degree signal, and obtaining the WTD on the basis of the accelerating pedal opening degree signal and a current speed of the vehicle; and controlling the vehicle to enter a corresponding working mode, according to the SOC and the WTD.

In the control method, the vehicle is controlled to enter a best working mode, according to the SOC and WTD, Therefore, the parts of the vehicle can work in a best mode, and this improves the performance of the vehicle.

Preferably, the working mode comprises: a parking mode, a rear axle electrically-driven mode, a four-wheels driving mode, an engine start-stop mode, a serially-driving mode and a front axle driving mode.

Preferably, the vehicle is controlled to enter the parking mode when the vehicle speed is 0.

Preferably, controlling the vehicle to enter the engine start-stop mode, when meeting any of the following conditions:

in case the current mode of the vehicle is the parking mode, the SOC is greater than a first threshold T1 and the WTD is greater than a rear wheel maximum torque RVVMD; or the SOC is less than a second threshold T2, which is less then T1;

in case the current mode of the vehicle is the four-wheels driving mode, SOC>T1, and 0<WTD<=RWMD; or WTD<=0;

in case the current mode of the vehicle is the front axle driving mode, SOC>T1, and 0<WTD<=RWMD; or WTD<=0;

in case the current mode of the vehicle is the serially-driving mode, SOC>T1, and 0<WTD<=RWMD; or WTD<=0;

in case the current mode of the vehicle is the rear axle electrically-driven mode, after the completion of the engine start, SOC>T1, and RWMD<WTD<=(EMW+FWMD); or after the completion of the engine start, SOC<T2, WTD>TB, and the dual-clutch automatic transmission presents no fault, wherein EMW is an engine maximum torque at wheel, and FWMD is a front wheel maximum torque, TB is a preset torque.

Preferably, controlling the vehicle to enter the front axle drive mode, when meeting any of the following conditions:

in case the current mode of the vehicle is the engine start-stop mode, after the completion of the engine start, SOC>a first threshold T1, and RWMD<WTD<=(EMW+FWMD); or after the completion of the engine start, SOC<T2, WTD>TB, and the dual-clutch automatic transmission presents no fault, wherein T2 is a second threshold T2 less then T1, EMW is an engine maximum torque at wheel, and FWMD is a front wheel maximum torque, TB is a preset torque, in case the current mode of the vehicle is the four-wheels driving mode, SOC>T1, and RWMD<WTD<=(EMW+FWMD); or SOC<T2, WTD>TB, and the dual-clutch automatic transmission presents no fault;

in case the current mode of the vehicle is the serially-driving mode, SOC>T1, and RWMD<WTD<=(EMW+FWMD); or SOC<T2, WTD>TB, and the dual-clutch automatic transmission presents no fault.

Preferably, the vehicle is controlled to enter the four wheel drive mode, when meeting any of the following conditions:

in case the current mode of the vehicle is the engine start-stop mode, after the completion of the engine start, SOC>a first threshold T1, WTD>RWMD and WTD (EMW+FWMD), wherein EMW is an engine maximum torque at wheel, and FWMD is a front wheel maximum torque, RWMD is a rear wheel maximum torque, in case the current mode of the vehicle is the front axle driving mode, SOC>T1, and WTD>(EMW+FWMD), in case the current mode of the vehicle is the serially-driving mode, SOC>T1, WTD>RWMD and WTD>(EMW+FWMD).

Preferably, controlling the vehicle to enter the serially-driving mode, when meeting any of the following conditions:

in case the current mode of the vehicle is the engine start-stop mode, after the completion of the engine start, SOC<T2, and 0<WTD<=TB; or after the completion of the engine start, SOC<T2, and the dual-clutch automatic transmission presents fault, wherein T2 is a second threshold T2 less then T1,TB is a preset torque, in case the current mode of the vehicle is the front axle driving mode, SOC<T2, and 0<WTD<=TB; or SOC<T2, and the dual-clutch automatic transmission presents fault.

Preferably, the vehicle is controlled to enter the rear axle electrically-driven mode when meeting any of the following conditions:

in case the current mode of the vehicle is the parking mode, the SOC is greater than a first threshold T1 and the WTD is greater than 0 and less than a rear wheel maximum torque RWMD, in case the current mode of the vehicle is the engine start-stop mode, after the completion of the engine start, WTD<=0; or after the completion of the engine start, SOC>T1, and 0<WTD<=RWMD.

Preferably, the vehicle is in the parking mode, setting the engine, the ISG motor and the rear wheel drive motor in a static state, and setting the first and second clutches in a closed state.

Preferably, if the vehicle is in the engine start-stop mode, when the engine starting, controlling the first clutch to close, controlling the second clutch to disengage, and controlling the ISG motor to drive the engine for starting the engine;

when the engine stopping, controlling the first clutch to close, controlling the second clutch to disengage, and controlling the ISG motor to assist the engine for stopping.

Preferably, when the vehicle is in the front axle drive mode and SOC>T1, if WTD>(EMW+FWMD), the torque command for controlling the engine is set as the engine maximum torque EM, the torque command for controlling the ISG motor is set as the maximum driving torque MID;

if (EOW+FWMD)<WTD<=(EMW+FWMD), the torque command for controlling the engine is set as (WTD−FWMD) IRE, the torque command for controlling the ISG motor is set as MID;

wherein EOW is an engine optimal torque at wheel, and the RE is the reduction ratio of transmission path of the engine;

if EOW<WTD (EOW+FWMD), the torque command for controlling the engine is set as an engine optimal torque EO, and the torque command for controlling the ISG motor is set as ((WTD−EOW))/RI, wherein RI is the reduction ratio of transmission path of the ISG motor;

if WTD<=EOW, judging whether WTD>EminW, if yes, the torque command for controlling the engine is set as WTD/RE, and the torque command for controlling the ISG motor is set as 0, otherwise, the torque command for controlling the engine is set as 0, and the torque command for controlling the ISG motor is set as WTD/RI; wherein EminW is an engine minimal torque at wheel.

Preferably, when the SOC is less than a second threshold T2, if WTD>EOW, the torque command for controlling the engine is set as WTD/RE, and the torque command for controlling the ISG motor is set as 0;

if WTD<=EOW, and WTD>(EOW−FWMR), the torque command for controlling the engine is set as EO, and the torque command for controlling the ISG motor is set as (EOW-WTD)/RI; wherein FWMR is a Front Wheel Maximum Regenerative Torque;

if (EMinW+FWMR)<WTD<=(EOW−FWMR), the torque command for controlling the engine is set as (WTD−FWMR)/RE, and the torque command for controlling the ISG motor is set as a Maximum ISG Regenerative Torque MIR;

If WTD<=(EMinW−FWMR), the torque command for controlling the engine is set as 0, and the torque command for controlling the ISG motor is set as 0.

Preferably, when the vehicle is in the front axle drive mode, if the target gear of engine transmission path is an even gear, controlling the first clutch to disengage, and controlling the second clutch to close;

if the target gear of engine transmission path is an odd gear, controlling the first clutch to close, and controlling the second clutch to disengage.

Preferably, when the vehicle is in the four wheel drive mode, the torque distributed for the rear axle is RWMD, and the torque distributed for the front axle is equal to (WTD-RWMD).

Preferably, when the vehicle is in the serially-driving mode, the ISG motor is controlled by means of a speed control mode, and the engine is controlled by means of a torque control mode, and the torque command for the rear wheel drive motor is equal to WTD/rear axle single-reduction ratio/the main reduction ratio.

Preferably, the first clutch is controlled to close, and the second clutch is controlled to disengage.

Preferably when the vehicle is in the rear axle electrically-driven mode, when WTD>0, the torque command for controlling the rear wheel drive motor is equal to WTD/rear axle single-reduction ratio/the main reduction ratio;

when WTD<=0, and the braking pedal opening degree is 0, the torque command for the rear wheel drive motor is set as a first torque threshold;

when the WTD<=0, and the braking pedal opening degree is greater than 0, the torque command for controlling the rear wheel drive motor is set as a second torque threshold which is greater than the first torque threshold.

Additional aspects and advantages of the present invention will be partly given in the following description, and will become apparent partly from the following description, or by practicing of the present invention.

BRIEF DESCRIPTION OF THE DRAWINGS

The above-mentioned and/or additional aspects and advantages of the invention will become clear when reading the following description in connection with the drawings.

DETAILED DESCRIPTION OF THE PREFERRED EMBODIMENT

Below is a detailed description of the embodiments of the invention. In the description, same or similar numerals labels represent same or similar elements, or components with same or similar functions. The description is used to illustrate the present invention, rather than to limit it.

Various embodiments or examples of the invention are disclosed in the description. In order to simplify the description, the parts and settings of specific examples are described below. They are just illustrative examples, and are not to limit the invention. In addition, the processes and materials mentioned in the present invention may be replaced by other processes or materials, as known by those skilled in the art. In addition, the description of "a first feature of the "on" a second structure" does not means the two feature necessarily contact with each other.

In addition, the terms "mount", "connect" and "couple" should be understood in a broad sense, for example, to be understood as including a mechanical connection and an electrical connection, a direct connection and an indirect connection, according to the understanding of those skilled in the art.

The following description and drawings is used to clearly illustrate some embodiments of the present invention. In these descriptions and drawings, some specific embodiments are disclosed, and they are not used to limit the present invention. Instead, the invention includes all of changes, modifications and equivalents falls within the spirit of claims of the present invention.

The hybrid power system according to the present invention will be illustrated in connection with drawings.

Figure 1:
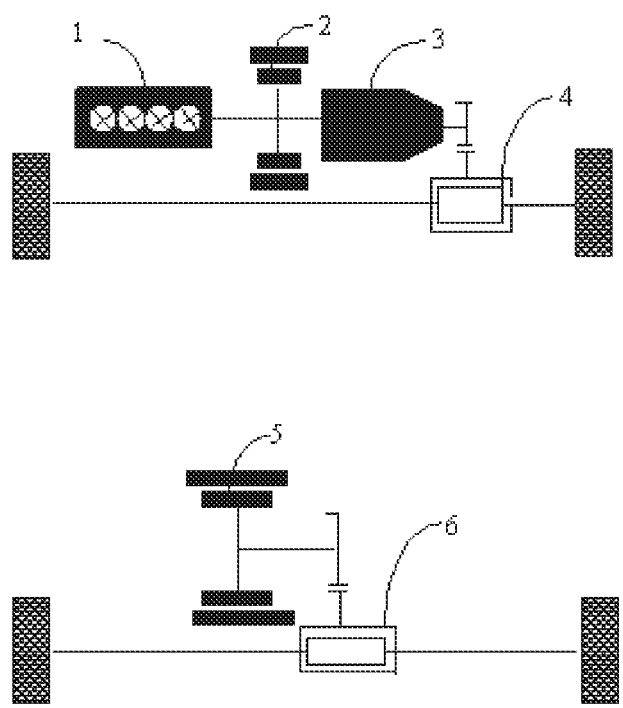
FIG. 1 is a schematic diagram of the main structure of the vehicle in prior art.
Figure 2:
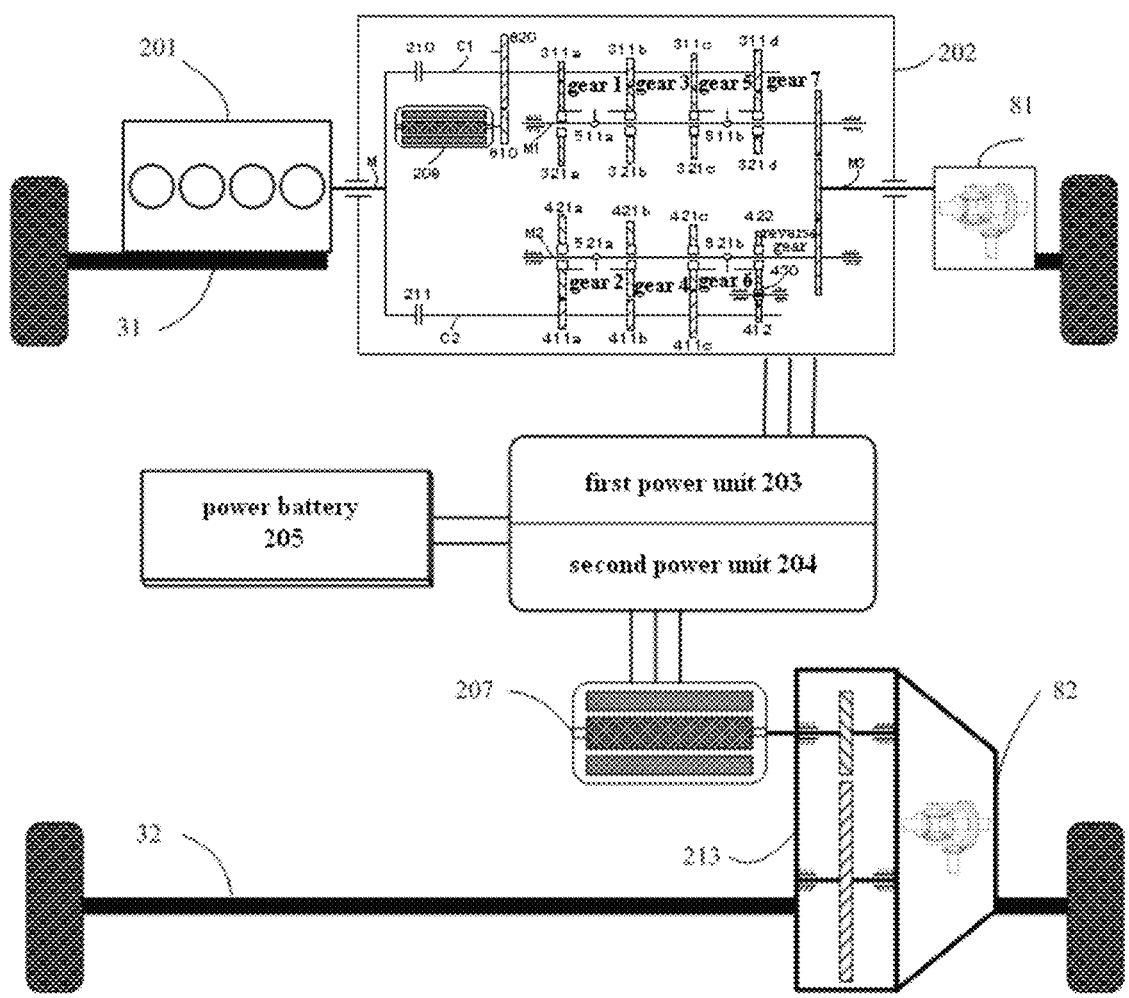
FIG. 2 is a schematic diagram of a hybrid power system for a vehicle, according to one embodiment of the present invention.

As shown in FIG. 2, the hybrid power system of one embodiment of the present invention includes an engine 201, a dual-clutch automatic transmission 202, a first power unit 204, a second power unit 205, a power battery 203, a power battery manager (not numbered), a rear wheel drive motor 207 and a vehicle controller (not numbered). The dual-clutch automatic transmission 202 includes a ISG motor 209, a first input shaft C1, a second input shaft C2, a general input shaft M, a first output shaft M1, a second output shaft M2, a general output shaft M3. The dual-clutch automatic transmission 202 is connected with the engine 201 at one end of the general input shaft M. The other end of the general input shaft M is connected with the first input shaft C1 and the second input shaft C2, by a first clutch 210 and a second clutch 211 respectively. The ISG motor 209 is connected with one of the first input shaft C1 and the second input shaft C2. One end of the general output shaft M3 is connected with the first output shaft M1 and the second output shaft M2, respectively. The other end of the general output shaft M3 is connected with a front reducer (not numbered) of the vehicle. The first power unit 203 and the second power unit 204 are used for the conversion of the AC and DC power. The Power battery 205 is connected with the ISG motor 209 through the first power unit 203. The DC power from the power battery 205 is converted to the AC power supplied to the ISG motor 209, by the first power unit 205. When the vehicle is running. The AC power from the ISG motor 203 can be converted to a DC power by the first power unit 209, so as to charge the power battery 205. The power battery manager is connected with the power battery 205 for detecting the SOC of the power battery 205. The rear wheel drive motor 207 is connected with the power battery 205 through the second power unit 204. The rear wheel drive motor 207 is connected with the rear reducer 213 of the vehicle 205. In one embodiment of the present invention, the rear reducer 213 is a single-stage reducer. The vehicle controller is connected with the power battery manager 205, and the vehicle controller controls the vehicle to enter corresponding working modes, according to the SOC and the Wheel Torque Demand WTD.

Figure 3:
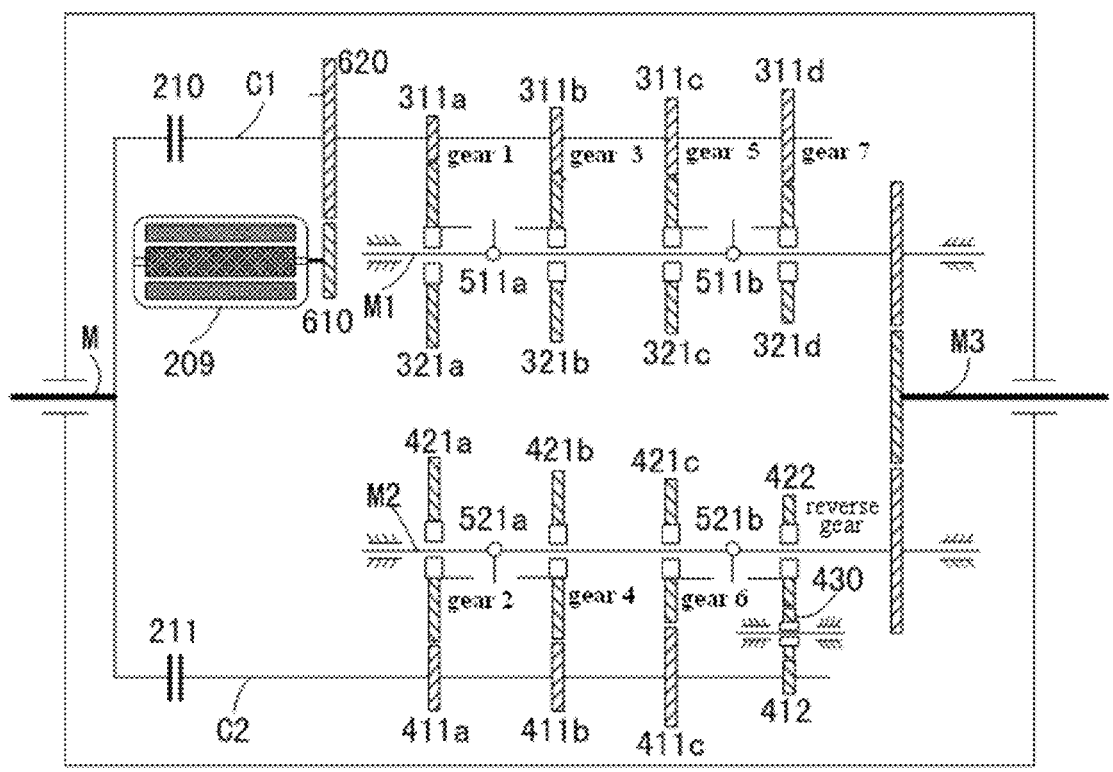
FIG. 3 is a schematic diagram of the structure of the dual-clutch automatic transmission for a vehicle, under one embodiment of the present invention.

Further, in one embodiment of the present invention, as shown in FIG. 3, the ISG motor 209 is integrated in the dual-clutch automatic transmission 202, thereby saving space, and the parts of the vehicle may be arranged in the vehicle more easily. Specifically, the first input shaft C1 of the dual-clutch automatic transmission 202 is provided with a first drive gear 311. The first output shaft M1 is provided with a first driven gear 321 engaging with the first driving gear 311. The second the input shaft C2 is provided with a second drive gear 411, and the second output shaft M2 is provided with a second driven gear 421 engaging with the second drive gear 411. In other words, the first driven gear 321 is set on the first output shaft M1, and the second driven gear 421 is set on the second output shaft M2. In one embodiment of the present invention, the first output shaft M1 is provided with at least one synchronization device, and the second output shalt is provided with at least one synchronization device. For example, as shown in FIG. 3, the first input shaft C1 and the second input shaft C2 are respectively provided with two synchronous devices. Wherein, the first synchronous device 510 is movably arranged on the first output shaft M1, between a first engaging position in which it engages with the first driven gear 321, and a first intermediate position in which it disengages from the first driven gear 321. The second synchronous device 520 is movably arranged on the second output shaft M2, between a second engaging position in which it engages with the second driven gear 421, and a second intermediate position in which it disengages from the second driven gear 421. In other words, as shown in FIG. 3, the dual-clutch automatic transmission 202 can have 7 gears. The vehicle has four odd gears (1, 3, 5 and 7), and three even gears (2, 4, 6) and a reverse gear. Correspondingly, the number of the first drive gear 311 is four (a drive gear 311a for the gear 1, a drive gear 311b for the gear 3, a drive gear 311c for the gear 5, and a drive gear 311d for the gear 7). The number of the first driven gear 321 is four (a driven gear 321a for the gear 1, a driven gear 321b for the gear 3, a driven gear 321c for the gear 5, and a driven gear 321d for the gear 7). The number of the second drive gear 411 is three (a second drive gear 411a for the gear 2, a second drive gear 411b for the gear 4, and a second drive gear 411c for the gear 6). The number of the second driven gear 421 is three (a second driven gear 421a for the gear 2, a second driven gear 421b for the gear 4, and a second driven gear 421c for the gear 6). The number of the first synchronization device 510 is two (510a for the gears 1 and 3, and 510b for the gears 5 and 7), the number of the second synchronization device 520 is two (520a for the gears 2 and 4, and 520b for the gear 5 and the reverse gear). In the embodiments of the invention, the ISG motor 209 may connect with the first input shaft C1 That is to say, the ISG motor 209 can be connected with the first input shaft C1 corresponding to the odd gears. The dual-clutch automatic transmission 202 can make a transmission more stable.

According to the structure of the dual-clutch automatic transmission 202, the working modes of the hybrid power system can include: a parking mode, a rear axle electrically-driven mode, a four-wheels driving mode, an engine start-stop mode, a serially-driving mode and a front axle driving mode. In some embodiments of the present invention, referring to FIGS. 2 and 3, a hybrid power system of the vehicle is described in detail in connection with the above modes 1. Parking Mode:

The engine 201, the ISG motor 209 and the rear axle drive motor 207 are stationary, and the first clutch 210 and the second clutch 211 are closed. The second synchronizer 520a for the gears 2 and 4 is located in the second, engaging position (i.e. the second synchronizer 520a engages with the second driven gear 421a), the first synchronizer 510a for the gears 1 and 3, and the first synchronizer 510b for the gears 5 and 7, are at the first intermediate position (i.e., the first driven gears 321a and 321b disengage from the first synchronizer 510a, the first driven gears 321c and 321d disengage from the synchronizer 510b), the second synchronizer 520b for the gear 6 and the reverse gear, is located in the second intermediate position (i.e., 6 and the second driven gear 421c and the third driven gear 422, disengage from the synchronizer 520b).

2. The Engine Start-Stop Mode

The mode consists of a starting state and a stopping state of the engine 201:

In the starting of the engine 201, a first clutch 210 is closed, and the second clutch 211 is disengaged.

On the first output shaft M1, the first synchronizer 510a for the gears 1 and 3, and the first synchronizer 510b for the gears 5 and 7, are located in the first intermediate position. The first output shaft M1 does not transmit power.

On the second output shaft M2, the second synchronizer 520b for the gear 6 and the reverse gear, is located in the second intermediate position. The second synchronizer 520a for the gears 2 and 4, engages with the second driven gear 421a.

The ISG motor 209 is inputted in with a preset torque command (e.g., 100 Nm), the power of the ISG motor 209 is delivered via the first gear 610, the second gear 620 and the first clutch 210, so as to drive and start the engine 201. If the engine reaches an idle speed, the engine 201 injects fuel, the second clutch 211 is closed, and the first clutch 210 disengages. The power of the engine 201 is delivered to the front axle 31, via the second clutch 211, the second drive gear 411a, the second driven gear 421a, and the second synchronizer 520a, the second output shaft M2, the general output shaft M3, the front reducer, and the front differential 81.

In the shutdown process of the engine 201, the first clutch 210 is dosed, and the second clutch 211 is disengaged, the first synchronizers 510a and 510b is located in the first intermediate position, and the second synchronizer 520b for the gears 5 and 7 is located in the second intermediate position, the second synchronizer 520a for the gears 2 and 4 engages with the second driven gear 421a for the gear 2. The ISG motor 209 helps the engine 201 to rapidly complete the shutdown process, for improving the emission performance.

3. The Front Axle Drive Mode

In this mode, if the transmission path or a target gear of the engine 201 corresponds to an even gear (for example, the gear 2), the second clutch 211 is closed, the first clutch 210 is disengaged, and the power of the engine 201 is transmitted to the general output shaft M3, via the second clutch 211, the second drive gear 411a and the second driven gear 421a, the second synchronizer 520a, the second output shaft M2. The power of the ISG motor 209 is transmitted to the general output shaft M3, via the first gear 610, the second gear 620 and the first drive gear 311 and the first driven gear 321 corresponding to the current gear. For example, if it is shifted to the gear 2 from the gear 1, then the gear 1 is the current gear, and the gear 2 is the target gear. The first drive gear 311 corresponding to the current gear (the gear 1) is the first drive gear 311a for the gear 1, and the first driven gear 321 corresponding to the current gear (the gear 1) is the first driven gear 321a for the gear 1. The gear of the transmission path of the ISG motor 209 should be suitably selected so that the ISG 209 would not run over its maximum speed, under a real-time vehicle speed. If the target gear is the gear 4, the second drive gear 411b and the second driven gear 421b are selected, and if the target gear is the gear 6, the second drive gear 411c and the second driven gear 421c are selected.

If the transmission path or the target gear of the engine 201 corresponds to an odd gear (for example, the gear 3), the first clutch 210 is closed, the second clutch 211 is disengaged, and the power of the engine 201 the ISG motor 209 is transmitted to the general output shaft M3, via the first clutch 210, the first drive gear 311b and the first driven gear 321a for the gear 3, the first synchronizer 510a, the first output shaft M1. The power of the ISG motor 209 is transmitted to the general output shaft M3, via the first gear 610, the second gear 620 and the drive and driven gears for the gear 3. If the target gear is the gear 5 or the gear 7, the only difference is that corresponding first drive gear 311 and first driven gear 321 are selected. If the target gear is the gear 5, the first drive gear 311c and the first driven gear 321c for the gear 5, are selected. If the target gear is the gear 7, the first drive gear 311d and the first driven gear 321d for the gear 7, are selected.

4. The Four Wheel Drive Mode

In this mode, the power transfer path of the front axle 31 is same to that of the front axle drive mode. The power battery 205 outputs an electric power to the rear axle drive motor 207, which in turn drives the rear axle 32, so that the vehicle works in the 4-wheel drive mode.

5. The Serially-Driving Mode

The first clutch 210 is closed, the second clutch 211 is disengaged, the first synchronizer 510a for the gears 1 and 3, and the first synchronizer 510b for the gears 5 and 7, are located in the first engaging position. The second synchronizer 520a for the gears 2 and 4, and the second synchronizer 520b for the gear 6 and the reverse gear, are at the second intermediate position. In other words, the four synchronizers are not engaged with any gear. At this time, the engine 201 drives the ISG motor 209, and the electric power is transferred to the power battery 205. Then the power battery transfers the electric power to the rear axle drive motor 207, so as to drive the vehicle.

6. The Rear Axle Electrically-Driven Mode

The first synchronizer 510a for the gears 1 and 3, and the first synchronizer 510b for the gears 5 and 7, are located in the first engaging position. The second synchronizer 520a for the gears 2 and 4, and the second synchronizer 520b for the gear 6 and the reverse gear, are at the second intermediate position. In other words, the four synchronizers do not engage with any gear. At this time, the front axle 31 does not output power, and the rear axle drive motor 207 drives the vehicle, or regenerates braking energy.

In one embodiment of the present invention, the vehicle controller of the hybrid power system can be used to control the vehicle wheel to enter a corresponding work mode, according to the SOC (State of Charge) value of the power battery 205 detected by the Power battery Management System (BMS), and the WTD (Wheel Torque Demand). Wherein, if the SOC is greater than a first power threshold T1 (for example 60%), and the power battery 205 can discharge, the state is defined as state 1, If the SOC is less than a second power threshold T2 (for example 40%), and the power battery 205 need to be charged, the state is defined as state 2. If the SOC is between 60% and 40%, the power battery remains unchanged. In addition, the WTD is determined as follows. The vehicle controller gets or determines the WTD, according to the acceleration pedal opening degree and the vehicle speed. For example, the WTD is less than or equal to 0, when the vehicle is in braking or sliding. Further, the gear ratio RI of the transmission path, of the ISG motor 209, is the product of an odd gear ratio and the main reduction ratio. For example, under the gear 1, R1 is the product of the gear ratio of the gear 1 multiplied by the main reduction ratio.

In addition, the gear ratio RE of the transmission path of the engine 201, is equal to RI, if the current gear is an odd gear; or equal to the product of the gear ratio of the even gear multiplied by the main reduction ratio. The target gear of the transmission path of the engine 201 is obtained or determined according to the acceleration pedal opening degree and the vehicle speed. The gear of the transmission path of the ISG motor 209 should be suitably selected so that that the ISG 209 would not run over its maximum speed.

Specifically, the vehicle controller obtains the MBD (Maximum Power battery Drive Torque) and MBR (Maximum Power battery Regenerative Torque) limited by the power battery 205, according to the real-time speed of the motor and the maximum discharge power and the maximum charge power sent by BMS (Power battery Management System).

The minimal of the MBD and MMD (Maximum Motor Drive Torque) sent by the MCU (Motor Control Unit) is the Rear Powertrain Maximum Drive Torque (RPMD). The minimal of the MBR and MMR (maximum motor regenerative torque) sent by the MCU is the Rear Powertrain Maximum Regenerative Torque (RPMR).

Further, the RWMD (Rear Wheel Maximum Drive Torque), delivered to the rear wheel from the rear axle drive motor 207, can be determined by getting the product of RPMD and the rear axle single-grade reduction ratio and the main drive ratio.

Similarly, the RWMR (Rear Wheel Maximum Regenerative Torque), delivered to the rear wheel from the rear axle drive motor 207, can be determined by getting the product of RPMR and the rear axle single-grade reduction ratio and the main drive ratio.

According to the specification of the front ISG motor 209, MID (Maximum ISG Drive Torque) and MIR (Maximum ISG Regenerative Torque), outputted by the front ISG motor 209, can be determined. The FWMD (Front Wheel Maximum Drive Torque) delivered to the front wheel from the front ISG motor 209, can be determined by getting the product of MID and the ratio of the current gear, and the main drive ratio. The FWMR (Front Wheel Maximum Regenerative Torque) delivered to the front wheel from the front ISG motor 209, can be determined by getting the product of MIR and the ratio of the current gear, and the main drive ratio.

In addition, according to the characteristic curve, the best fuel economy curve and the lowest torque curve (with a bad emission performance, and the engine can't work at this state) of the engine 201 by means of interpolation algorithm, we can It is possible to the real-time speed of engine 201 can determine EM (Engine Maximum Torque), EO (Engine Optimal Torque) and EMin (Engine Minimum Torque), corresponding to a real-time speed $n_e$.

EMW, EOW and EminW, the torques delivered to the wheel, can be determined by getting the product of EM, EO or Emin, and the ratio of the current gear and the main reduction ration. EM is delivered to the wheel via the transmission and the main reducer, and EMW is thus obtained. EO is delivered to the wheel via the transmission and the main reducer, and EOW is thus obtained. Emin is delivered to the wheel via the transmission and the main reducer, and EminW is thus obtained. In summary, the vehicle controller can control the vehicle to enter a working mode, corresponding to the status of the power battery 205 and the WTD, so as to ensure that the vehicle works in the best working mode. In one embodiment of the invention, the vehicle controller can control the shift among the parking mode, the rear axle electrically-driven mode, the four-wheels driving mode, the engine start-stop mode, the serially-driving mode and the front axle driving mode, according to the SOC and WTD. The specific shifting process of the working mode will be illustrated in the control method of the vehicle as mentioned below.

In summary, according to the hybrid power system of the embodiments of the present invention, the vehicle controller controls the vehicle to enter the best working mode, according to the SOC of the power battery detected by BMS and the WTD. Therefore, all parts of the vehicle can be in the best working condition, so as to improve the vehicle performance. In addition, the ISG motor is integrated in the dual-clutch automatic transmission, this will save the space of the vehicle, and the arrangement of parts in the vehicle becomes easy.

The following description in connection with the drawings is for a vehicle.

Figure 4:
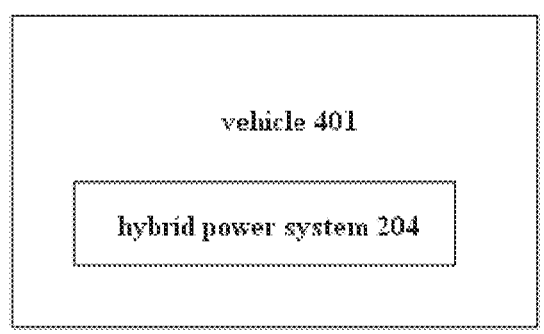
FIG. 4 is a block diagram of a vehicle according to one embodiment of the present invention.

As shown in FIG. 4, the vehicle 401 of one embodiment of the invention includes a hybrid power system 402 of the previous embodiments of the present invention.

The vehicle of the embodiment of the invention, is provided with previous hybrid power system, and may work in a best working mode, so as to improve the working performance of the vehicle.

The following description in connection with the drawings, illustrate a control method for controlling the vehicle.

Figure 5:
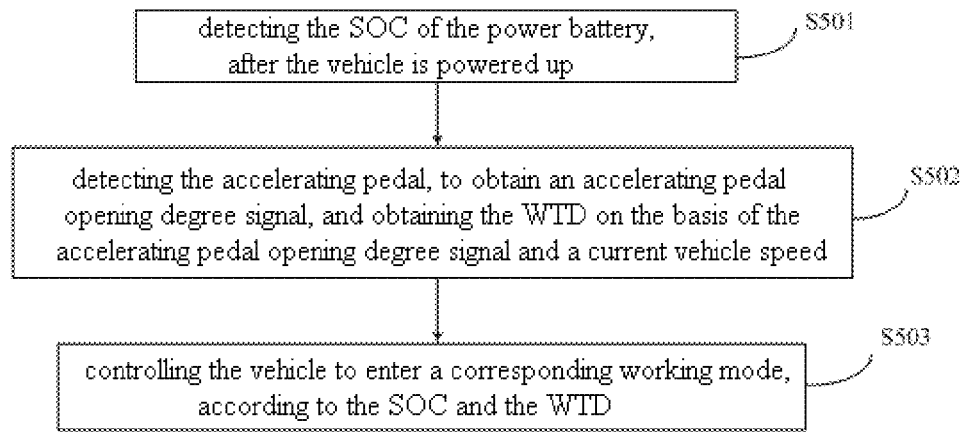
FIG. 5 is a flow chart of the control method according to one embodiment of the present invention.

As shown in FIG. 5, the control method includes the following steps.

S501 detecting the SOC of the power battery, after the vehicle is powered up.

After the vehicle is powered up, it is possible to detect the SOC of the power battery. In one embodiment, the state of the power battery 205 is determined according to the SOC of the power battery. For example, if the SOC is greater than a first threshold T1 (for example 60%), the power battery 205 can be controlled to discharge, the state may be defined as state 1. If the SOC is less than a second threshold T2 (for example 40%), the power battery 205 needs to be charged, and the state may be defined as state 2. If the SOC is between T1 and 12, for example between 60% and 40%, the power battery may be controlled to remains unchanged.

S502, detecting the accelerating pedal, so as to obtain a accelerating pedal opening degree signal, and obtaining the WTD on the basis of the accelerating pedal opening degree signal and a current speed of the vehicle.

In one embodiment of the present invention, the Wheel Torque Demand WTD is determined according to the acceleration pedal opening degree and the vehicle speed. For example, the WTD is less than or equal to 0, when the vehicle is in braking or sliding. Further, the gear ratio RI of the transmission path of the ISG motor 209, is the product of an odd gear ratio and the main reduction ratio. For example, under the gear 1, RI is the product of the gear ratio of the gear 1 multiplied by the main reduction ratio. In addition, the gear ratio RE of the transmission path of the engine 201, is equal to RI, if the current gear is an odd gear; or equal to the product of the gear ratio of the even gear multiplied by the main reduction ratio. The target gear of the transmission path of the engine 201 is obtained according to the acceleration pedal opening degree and the vehicle speed. The gear of the transmission path of the ISG motor 209 should be suitably selected so that that the ISG 209 would not run over its maximum speed.

Specifically, the vehicle controller obtains the MBD (Maximum Power battery Drive Torque) and MBR (Maximum Power battery Regenerative Torque) limited by the power battery 205, according to the real-time speed of the motor and the maximum discharge power and the maximum charge power sent by BMS (Power battery Management System). The minimal of the MBD and MMD (Maximum Motor Drive Torque) sent by the MCU (Motor Control Unit) is the Rear Powertrain Maximum Drive Torque (RPMD). The minimal of the MBR and MMR (maximum motor regenerative torque) sent by the MCU is the Rear Powertrain Maximum Regenerative Torque (RPMR). Further, the RWMD (Rear Wheel Maximum Drive Torque), delivered to the rear wheel from the rear axle drive motor 207, can be determined by getting the product of RPMD and the rear axle single-grade reduction ratio and the main drive ratio. Similarly, the RWMR (Rear Wheel Maximum Regenerative Torque), delivered to the rear wheel from the rear axle drive motor 207, can be determined by getting the product of RPMR and the rear axle single-grade reduction ratio and the main drive ratio.

According to the specification of the front ISG motor 209, MID (Maximum ISG Drive Torque) and MIR (Maximum ISG Regenerative Torque), outputted by the front ISG motor 209, can be determined. The FWMD (Front Wheel Maximum Drive Torque) delivered to the front wheel from the front ISG motor 209, can be determined by getting the product of MID and the ratio of the current gear, and the main drive ratio. The FWMR (Front Wheel Maximum Regenerative Torque) delivered to the front wheel from the front ISG motor 209, can be determined by getting the product of MIR and the ratio of the current gear, and the main drive ratio.

In addition, according to the characteristic curve, the best fuel economy curve and the lowest torque curve (with a bad emission performance, and the engine should not work at this state) of the engine 201, by means of interpolation algorithm, we can It is possible to the real-time speed of engine 201 can determine EM (Engine Maximum Torque), EO (Engine Optimal Torque) and EMin (Engine Minimum Torque), corresponding to a real-time speed $n_e$.

EMW, EOW and EminW, the torques delivered to the wheel, can be determined by getting the product of EM, EO or Emin, and the ratio of the current gear and the main reduction ration. EM is delivered to the wheel via the transmission and the main reducer, and EMW is thus obtained. EO is delivered to the wheel via the transmission and the main reducer, and EOW is thus obtained. Emin is delivered to the wheel via the transmission and the main reducer, and EminW is thus obtained.

S503. controlling the vehicle to enter a corresponding working mode, according to the SOC detected at step S501 and the WTD obtained at step S502.

In one embodiment, the working mode of the vehicle comprises: a parking mode, a rear axle electrically-driven mode, a four-wheels driving mode, an engine start-stop mode, a serially-driving mode and a front axle driving mode. It is possible to control the vehicle to enter a corresponding working mode, according to the WTD and the SOC of the power battery 205.

Figure 6:
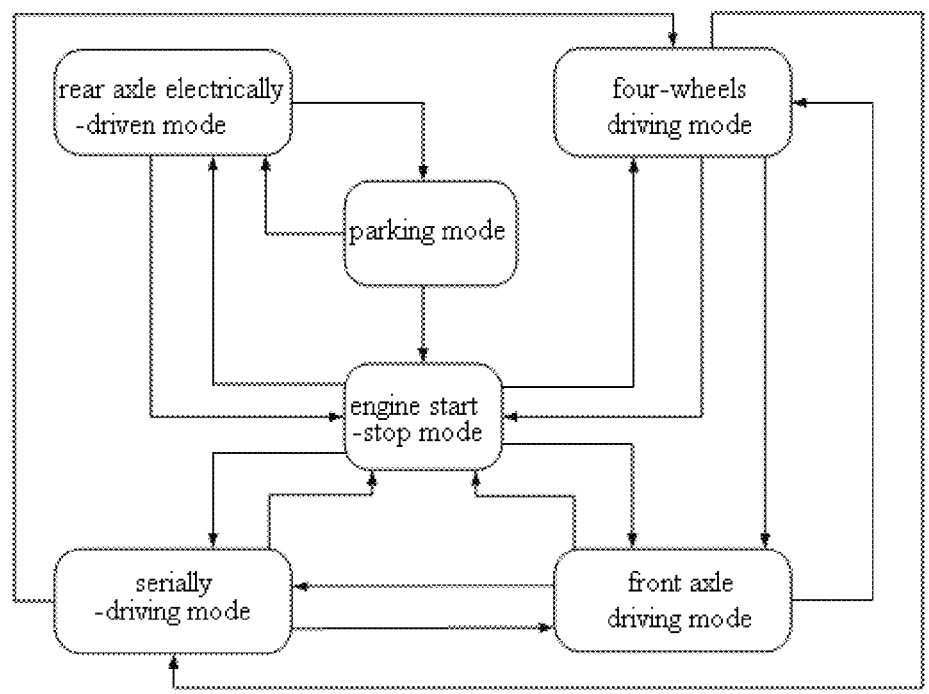
FIG. 6 is a schematic diagram showing the shift among the working modes, according to one embodiment of the present invention.

In one embodiment, the parts of the vehicle are controlled to be in various states, so that the vehicle enters a corresponding working mode. It is possible to control the shift among the parking mode, the rear axle electrically-driven mode, the four-wheels driving mode, the engine start-stop mode, the serially-driving mode and the front axle driving mode, according to the SOC and the WTD. FIG. 6 is a schematic diagram showing the shift among the working modes, according to one embodiment of the present invention.

In some embodiments, the vehicle is controlled to enter the parking mode when the vehicle speed is 0. When the vehicle is in the parking mode, the engine 201, the ISG motor 209 and the rear wheel drive motor 207 are set in a static state, and the first and second clutches 210 and 211 are set in a closed state.

In one embodiment of the present invention, if the vehicle is in the engine start-stop mode includes an engine starting mode and an engine stopping mode. When the engine starting, controlling the first clutch 210 to close, controlling the second clutch 211 to disengage, controlling the odd gear synchronizer to disengage, and controlling the ISG motor 209 to drive the engine 201 for starting the engine 201. When the engine stopping, controlling the first clutch 210 to close, controlling the second clutch 211 to disengage, and controlling the ISG motor 209 to assist the engine 201 for stopping. It is possible to control the vehicle to enter the engine start-stop mode, when meeting any of the following conditions:

in case the current mode of the vehicle is the parking mode, the SOC of the power battery 205 is greater than a first threshold T1 (state 1) and the WTD is greater than the rear wheel maximum torque RWMD; or the SOC is less than the second threshold T2 (state 1), wherein T2 is less then T1;

in case the current mode of the vehicle is the four-wheels driving mode, SOC>T1, and 0<WTD<=RWMD; or WTD<=0;

in case the current mode of the vehicle is the front axle driving mode, SOC>T1, and 0<WTD<=RWMD; or WTD<=0;

in case the current mode of the vehicle is the serially-driving mode, SOC>T1, and 0<WTD<=RWMD; or WTD<=0;

in case the current mode of the vehicle is the rear axle electrically-driven mode, after the completion of the engine start, SOC>T1, and RWMD<WTD<=(EMW+FWMD); or after the completion of the engine start, SOC<T2 (state 2), WTD>TB, and the dual-clutch automatic transmission presents no fault or works normally.

EMW is an engine maximum torque at wheel, FWMD is a front wheel maximum torque, and TB is a preset torque set according to specific parameters of the engine 201, so that the engine 201 would not work in a low-efficient area.

In another embodiment of the present invention, when the vehicle is in the front axle drive mode and SOC of the power battery 208>T1 (for example 60%), if WTD>(EMW+FWMD), the torque command for controlling the engine 201 is set as the engine maximum torque EM, the torque command for controlling the ISG motor 209 is set as the maximum driving torque MID;

if (EOW+FWMD)<WTD<=(EMW+FWMD), the torque command for controlling the engine 201 is set as (WTD−FWMD) IRE; the torque command for controlling the ISG motor 209 is set as MID; wherein EOW is an engine optimal torque at wheel, and the RE is the reduction ratio of transmission path of the engine;

if EOW<WTD<=(EOW+FWMD), the torque command for controlling the engine is set as EO, and the torque command for controlling the ISG motor is set as (WTD−EOW)/RI, wherein RI is the reduction ratio of transmission path of the ISG motor;

if WTD<=EOW, judging whether WTD>EminW, if yes, the torque command for controlling the engine 201 is set as WTD/RE, and the torque command for controlling the ISG motor 209 is set as 0, otherwise, the torque command for controlling the engine is set as 0, and the torque command for controlling the ISG motor is set as WTD/RI; wherein EminW is an engine minimal torque at wheel.

In another embodiment of the present invention, when the vehicle is in the front axle drive mode and the SOC is less than a second threshold T2, if WTD>EOW, the torque command for controlling the engine 201 is set as WTD/RE, and the torque command for controlling the ISG motor 209 is set as 0;

if WTD<=EOW, and WTD>(EOW−FWMR), the torque command for controlling the engine 201 is EO, and the torque command for controlling the ISG motor 209 is (EOW−WTD)/RI; wherein FWMR is a Front Wheel Maximum Regenerative Torque;

if (EMinW+FWMR)<WTD<=(EOW−FWMR), the torque command for controlling the engine is (WTD−FWMR)/RE, and the torque command for controlling the ISG motor is a Maximum ISG Regenerative Torque MIR;

if WTD<=(EMinW−FWMR), the torque command for controlling the engine is 0, and the torque command for controlling the ISG motor is 0.

When the vehicle is in the front axle drive mode, if the target gear of transmission path of the engine 201 is an even gear, controlling the first clutch 210 to disengage, and controlling the second clutch 211 to close; if the target gear of transmission path of the engine 201 is an odd gear, controlling the first clutch 210 to close, and controlling the second clutch 211 to disengage.

In one embodiment of the present invention, it is possible to control the vehicle to enter the front axle drive mode, when meeting any of the following conditions:

in case the current mode of the vehicle is the engine start-stop mode, after the completion of the engine start, SOC>T1, and RWMD<WTD<=(EMW+FWMD); or after the completion of the engine start, SOC<T2, WTD>TB, and the dual-clutch automatic transmission presents no fault, wherein EMW is an engine maximum torque at wheel, and FWMD is a front wheel maximum torque, TB is a preset torque, in case the current mode of the vehicle is the four-wheels driving mode, SOC>T1, and RWMD<WTD<=(EMW+FWMD); or SOC<T2, WTD>TB, and the dual-clutch automatic transmission presents no fault; or in case the current mode of the vehicle is the serially-driving mode, SOC>T1, and RWMD<WTD<=(EMW+FWMD); or SOC<T2, WTD>TB, and the dual-clutch automatic transmission presents no fault.

In one embodiment of the present invention, when the vehicle is in the four wheel drive mode, the torque distributed for the rear axle is RWMD, and the torque distributed for the front axle is equal to (WTD−RWMD). In the embodiment, it is possible to control the vehicle to enter the four wheel drive mode, when meeting any of the following conditions:

in case the current mode of the vehicle is the engine start-stop mode, after the completion of the engine start, SOC>T1 (for example 60%), WTD>RWMD and WTD>(EMW+FWMD), wherein EMW is an engine maximum torque at wheel, and FWMD is a front wheel maximum torque, RWMD is a rear wheel maximum torque, or in case the current mode of the vehicle is the front axle driving mode, SOC>T1 (for example 60%), and WTD>(EMW+FWMD), or in case the current mode of the vehicle is the serially-driving mode, SOC>T1 (for example 60%), WTD>RWMD and WTD>(EMW+FWMD).

In one embodiment of the present invention, when the vehicle is in the serially-driving mode, the ISG motor 209 is controlled by means of a speed control mode, and the engine 201 is controlled by means of a torque control mode, and the torque command for the rear wheel drive motor is equal to WTD/rear axle single-reduction ratio/the main reduction ratio. As the power of the rear wheel drive motor is delivered to wheels via a single-stage reducer and the main reducer, the torque delivered to the wheel from the rear wheel drive motor is equal to the torque of the rear wheel drive motor multiplied by the single-stage ratio and the main ratio. In the serially-driving mode, it is only the rear wheel drive motor supplies power. For meeting the requirement of WTD, the power or torque outputted by the rear wheel drive motor is equal to WTD/rear axle single-reduction ratio/the main reduction ratio. At the same time, the first clutch 210 is controlled to close and the second clutch 211 is controlled to disengage.

In one embodiment of the present invention, it is possible to control the vehicle to enter the serially-driving mode, when meeting any of the following conditions:

in case the current mode of the vehicle is the engine start-stop mode, after the completion of the engine start, SOC<T2, and 0<WTD<=TB; or after the completion of the engine start, SOC<T2, and the dual-clutch automatic transmission presents fault, wherein T2 is a second threshold T2 less then T1,TB is a preset torque; or in case the current mode of the vehicle is the front axle driving mode, SOC<T2, and 0<WTD<=TB; or SOC<T2, and the dual-clutch automatic transmission presents fault.

In one embodiment of the present invention, when the vehicle is in the rear axle electrically-driven mode, when the WTD>0, the torque command for controlling the rear wheel drive motor 207 is equal to WTD/rear axle single-reduction ratio/the main reduction ratio;

when WTD<=0, and the braking pedal opening degree is 0, the torque command for the rear wheel drive motor 207 is a first torque threshold;

when WTD<=0, and the braking pedal opening degree is greater than 0, the torque command for controlling the rear wheel drive motor 207 is a second torque threshold which is greater than the first torque threshold.

In one embodiment of the present invention, it is possible to control the vehicle to enter the rear axle electrically-driven mode when meeting any of the following conditions:

in case the current mode of the vehicle is the parking mode, SOC>T1, 0<WTD<a rear wheel maximum torque RWMD, or in case the current mode of the vehicle is the engine start-stop mode, after the completion of the engine start, WTD<=0; or after the completion of the engine start, SOC>T1, and 0<WTD<=RWMD.

In summary, according to the vehicle's control method of the present invention, it is capable of control the vehicle to enter a working mode corresponding to the SOC of the vehicle's power battery and the WTD to so that the vehicle may enter into the best work mode, and each part of the vehicle is in the best working condition. This improves the performance of the vehicle. In addition, by controlling the vehicle to switch among the various working modes, it improves the flexibility of the vehicle operating mode, and improves the performance of the vehicle.

Any process or method shown in the drawings or described herein may be understood as including one or more module, fragment, or part of codes that is used to implement a particular logical function or process, and the scope of the preferred embodiments of the invention includes a further implementation, which may be executed in a different sequence or order.

The logic and/or steps, described in the flow chart or in other forms, for example, can be considered as a set of executable instructions for implementing logic functions, which can be implemented in any computer readable medium, for being used by instruction execution systems and devices (e.g., computer-based systems). "Computer readable media" may be any device that can contain, store, communicate, or transfer programs for ins truction execution systems or devices. Computer readable medium includes but not limits to the following: electrical connection parts (electronic devices) with one or a plurality of wirings, portable computer disk cartridge (magnetic device), random access memory (RAM), read-only memory (ROM), erasable programmable read-only memory (EPROM or flash memory), optical fiber device, and portable compact disc read-only memory (CD-ROM). In addition, a computer readable medium may even be a paper or other suitable medium for printing the program. For example, by means of optically scanning a paper or other medium, and then editing or processing, the program may be obtained in an electric mode, and then may be stored in a computer memory.

It should be understood that each part of the present invention can be realized by hardware, software, firmware or their combination. In these embodiments, a plurality of steps or methods may be implemented by a software or firmware stored in the memory and executed by the appropriate instruction execution system. For example, if you use hardware to implement, any of the following techniques in this field can be used: a logic gate circuit, a dedicated integrated circuit, a programmable gate array (PGA), and a field programmable gate array (FPGA).

The technical personnel in this technical field can understand that all or parts of the steps in the above examples can be implemented by controlling the hardware with a program or programs. The program(s) can be stored in a computer readable storage medium.

In addition, the various function units in various embodiments of the invention can be integrated in a processing module, and can also be separate physical units, or two or more than two units can be integrated in one module. The module can be realized in the form of hardware and software. The integrated module can be stored in a computer readable storage medium. The above mentioned storage medium can be read only memory, disk or CD, etc.

In the specification, the reference term one embodiment", some examples", "sample", "concrete example", or "some sample" means the implementation of an embodiment or an example. In this specification, the above terms does not necessarily mean a same embodiment or example. Moreover, the specific features, structures, or materials can be combined in any of the one or more examples or embodiments suitably.

The illustrated embodiments of the invention are not intended to limit the invention, for the technical personnel in this field, the invention can have various changes and modification. In the spirit and principle of the present invention, any modification, replacement, improvement, etc. shall be included in the scope of protection of the invention.

The invention claimed is:

1. A hybrid power system for a vehicle, comprising:
   an engine;
   a dual-clutch automatic transmission, comprising an ISO motor, a first input shaft, a second input shaft, a general input shaft and a first output shaft, a second output shaft, a general output shaft, the dual-clutch automatic transmission is connected with the engine via one end of the general input shaft, the other end of the general input shaft is connected with the first input shaft and the second input shaft, via a first clutch and a second clutch respectively, the ISG motor is connected with one of the first input shaft and the second input shaft, one end of the general output shaft is connected with the first output shaft and the second output shaft respectively, the other end of the general output shaft is connected with a front reducer of the vehicle;
   a first power unit and a second power unit;
   a power battery, connected to the ISG motor via the first power unit;
   a BMS, connected with the power battery, for detecting a SOC of the power battery
   a rear wheel drive motor, connected with the power battery via the second power unit, and connected with the rear reducer of the vehicle; and
   a vehicle controller, connected with the BMS, and used for controlling the vehicle to enter a corresponding working mode, according to the SOC and a wheel torque demand WTD.

2. The hybrid power system of claim 1, wherein the vehicle controller determines the WTD according a vehicle speed and an accelerating pedal opening degree.

3. The hybrid power system of claim 1, wherein, the working mode comprises: a parking mode, a rear axle electrically-driven mode, a four-wheels driving mode, an engine start-stop mode, a serially-driving mode and a front axle driving mode.

4. The hybrid power system of claim 1, wherein the vehicle controller controls the shift among the parking mode, the rear axle electrically-driven mode, the four-wheels driving mode, the engine start-stop mode, the serially-driving mode and the front axle driving mode, according to the SOC and the WTD.

5. The hybrid power system of claim 1, wherein the first output shaft is provided with at least one synchronizer, and the second output shaft is provided with at least one synchronizer.

6. The hybrid power system of claim 1, wherein the rear reducer is a single-speed reducer.

7. A vehicle, comprising the hybrid power system of claim 1.

8. A control method for a vehicle, including the hybrid power system of claim 1, wherein the method comprises the following steps:
   detecting the SOC of the power battery, after the vehicle is powered up;
   detecting the accelerating pedal, so as to obtain a accelerating pedal opening degree signal, and obtaining the WTD on the basis of the accelerating pedal opening degree signal and a current speed of the vehicle; and
   controlling the vehicle to enter a corresponding working mode, according to the SOC and the WTD.

9. The control method of claim 8, wherein the working mode comprises: a parking mode, a rear axle electrically-driven mode, a four-wheels driving mode, an engine start-stop mode, a serially-driving mode and a front axle driving mode.

10. The control method of claim 9, wherein the vehicle is controlled to enter the parking mode when the vehicle speed is 0.

11. The control method of claim 9, wherein controlling the vehicle to enter the engine start-stop mode, when meeting any of the following conditions:
   in case the current mode of the vehicle is the parking mode, the SOC is greater than a first threshold T1 and the WTD is greater than a rear wheel maximum torque RWMD; or the SOC is less than a second threshold T2, which is less then T1;
   in case the current mode of the vehicle is the four-wheels driving mode, SOC>T1, and 0<WTD<=RWMD; or WTD<=0;
   in case the current mode of the vehicle is the front axle driving mode, SOC>T1, and 0<WTD<=RWMD; or WTD<=0;
   in case the current mode of the vehicle is the serially-driving mode, SOC >T1, and 0<WTD<=RWMD; or WTD<=0;
   in case the current mode of the vehicle is the rear axle electrically-driven mode, after the completion of the engine start, SOC>T1,and RWMD<WTD<=(EMW+FWM)); or after the completion of the engine start, SOC<T2,WTD>TB, and the dual-clutch automatic transmission presents no fault,
   wherein EMW is an engine maximum torque at wheel, and FWMD is a front wheel maximum torque, TB is a preset torque.

12. The control method of claim 9, wherein controlling the vehicle to enter the front axle drive mode, when meeting any of the following conditions:
   in case the current mode of the vehicle is the engine start-stop mode, after the completion of the engine start, SOC>T1, and RWM<WTD<=(EMW+FWMD); or after the completion of the engine start, SOC<T2, WTD>TB, and the dual-clutch automatic transmission presents no fault,
   wherein T2 is a second threshold T2 less then T1, EMW is an engine maximum torque at wheel, and FWMD is a front wheel maximum torque, TB is a preset torque,
   in case the current mode of the vehicle is the four-wheels driving mode, SOC>T1, and RWMD<WTD<=(EMW+FWMD); or SOC<T2,WTD>TB, and the dual-clutch automatic transmission presents no fault;
   in case the current mode of the vehicle is the serially-driving mode, SOC>T1, and RWMD<WTD<=(EMW+FWMD); or SOC<T2,WTD>TB, and the dual-clutch automatic transmission presents no fault.

13. The control method of claim 9, wherein controlling the vehicle to enter the four wheel drive mode, when meeting any of the following conditions:
   in case the current mode of the vehicle is the engine start-stop mode, after the completion of the engine start, SOC>a first threshold T1, WTD>RWM and WTD>(EMW+FWMD),
   wherein EMW is an engine maximum torque at wheel, and FWMD is a front wheel maximum torque, RWMD is a rear wheel maximum torque,
   in case the current mode of the vehicle is the front axle driving mode, SOC>T1, and WTD>(EMW +FWMD),
   in case the current mode of the vehicle is the serially-driving mode, SOC>T1, WTD>RWMD and WTD>(EMW+FWMD).

14. The control method of claim 9, wherein controlling the vehicle to enter the serially-driving mode, when meeting any of the following conditions:

in case the current mode of the vehicle is the engine start-stop mode, after the completion of the engine start, SOC<T2, and 0<WTD<=TB; or after the completion of the engine start, SOC<T2, and the dual-clutch automatic transmission presents fault, wherein T2 is a second threshold T2 less then T1,TB is a preset torque, in case the current mode of the vehicle is the front axle driving mode, SOC<T2, and 0<WTD<=TB: or SOC<T2, and the dual-clutch automatic transmission presents fault.

15. The control method of claim 9, wherein, controlling the vehicle to enter the rear axle electrically-driven mode when meeting any of the following conditions:

in case the current mode of the vehicle is the parking mode, the SOC is greater than a first threshold T1 and the WTD is greater than 0 and less than a rear wheel maximum torque RWMD, in case the current mode of the vehicle is the engine start-stop mode, after the completion of the engine start, WTD<=0; or after the completion of the engine start, SOC>T1, and0<WTD<=RWMD.

16. The control method of claim 10, wherein, when the vehicle is in the parking mode, setting the engine, the ISG motor and the rear wheel drive motor in a static state, and setting the first and second clutches in a dosed state.

17. The control method of claim, 11, wherein if the vehicle is in the engine start-stop mode, when the engine starting, controlling the first clutch to close, controlling the second clutch to disengage, and controlling the ISG motor to drive the engine for starting the engine;

when the engine stopping, controlling the first clutch to close, controlling the second clutch to disengage, and controlling the ISG motor to assist the engine for stopping.

18. The control method of claim 12, wherein, when the vehicle is in the front axle drive mode and SOC>T1, if WTD>(EMW +FWMD), the torque command for controlling the engine is set as the engine maximum torque EM, the torque command for controlling the ISG motor is set as the maximum driving torque MID;

if (EOW+FWMD)<WTD<=(EMW+FWMD), the torque command for controlling the engine is set as (WTD−FWMD)/RE, the torque command for controlling the ISG motor is set as MID;

wherein EOW is an engine optimal torque at wheel, and the RE is the reduction ratio of the transmission path of the engine;

if EOW<WTD<=(EOW+FWMD), the torque command for controlling the engine is set as EO, and the torque command for controlling the ISG motor is set as (WTD−EOW)/RI, wherein RI is the reduction ratio of the transmission path of the ISG motor;

if WTD<=EOW, judging whether WTD>EminW, if yes, the torque command for controlling the engine is set as WTD/RE, and the torque command for controlling the ISG motor is set as 0, otherwise, the torque command for controlling the engine is set as 0, and the torque command for controlling the ISG motor is set as WTD/RI; wherein EminW is an engine minimal torque at wheel.

19. The control method of claim 18, wherein when the SOC is less than a second threshold T2, if WTD>EOW, the torque command for controlling the engine is set as WTD/RE, and the torque command for controlling the ISG motor is set as 0;

if WTD<=EOW, and WTD>(EOW−FWMR), the torque command for controlling the engine is set as EO, and the torque command for controlling the ISG motor is set as (EOW−WTD)/RI; wherein FWMR is a Front Wheel Maximum Regenerative Torque;

if (EMinW+FWMR)<WTD<=(EOW−FWMR), the torque command for controlling the engine is set as (WTD−FWMR)/RE, and the torque command for controlling the ISG motor is set as a Maximum ISG Regenerative Torque MIR;

If WTD<=(EMinW−FWMR), the torque command for controlling the engine is set as 0, and the torque command for controlling the ISG motor is set as 0.

20. The control method of claim 12, wherein, when the vehicle is in the front axle drive mode, if the target gear of engine transmission path is an even gear, controlling the first clutch to disengage, and controlling the second clutch to close;

if the target gear of engine transmission path is an odd gear, controlling the first clutch to close, and controlling the second clutch to disengage.

21. The control method of claim 13, wherein, when the vehicle is in the four wheel drive mode, the torque distributed for the rear axle is RWMD, and the torque distributed for the front axle is equal to (WTD−RWMD).

22. The control method of claim 14, wherein, when the vehicle is in the serially-driving mode, the ISG motor is controlled by means of a speed control mode, and the engine is controlled by means of a torque control mode, and the torque command for the rear wheel drive motor is equal to WTD/rear axle single-reduction ratio/ the main reduction ratio.

23. The control method of claim 22, wherein controlling the firs clutch to close, and controlling the second clutch to disengage.

24. The control method of claim 15, wherein, when the vehicle is in the rear axle electrically-driven mode, when the WTD is greater than 0, the torque command for controlling the rear wheel drive motor is equal to WTD/rear axle single-reduction ratio/ the main reduction ratio;

when the WTD is less than or equal to 0, and the braking pedal opening degree is 0, the torque command for the rear wheel drive motor is set as a first torque threshold;

when the WTD is less than or equal to 0, and the braking pedal opening degree is greater than 0the torque command for controlling the rear wheel drive motor is set as a second torque threshold which is greater than the first torque threshold.

* * * * *